(No Model.)
C. A. LIEB.
FRICTION PULLEY.
No. 329,575. Patented Nov. 3, 1885.
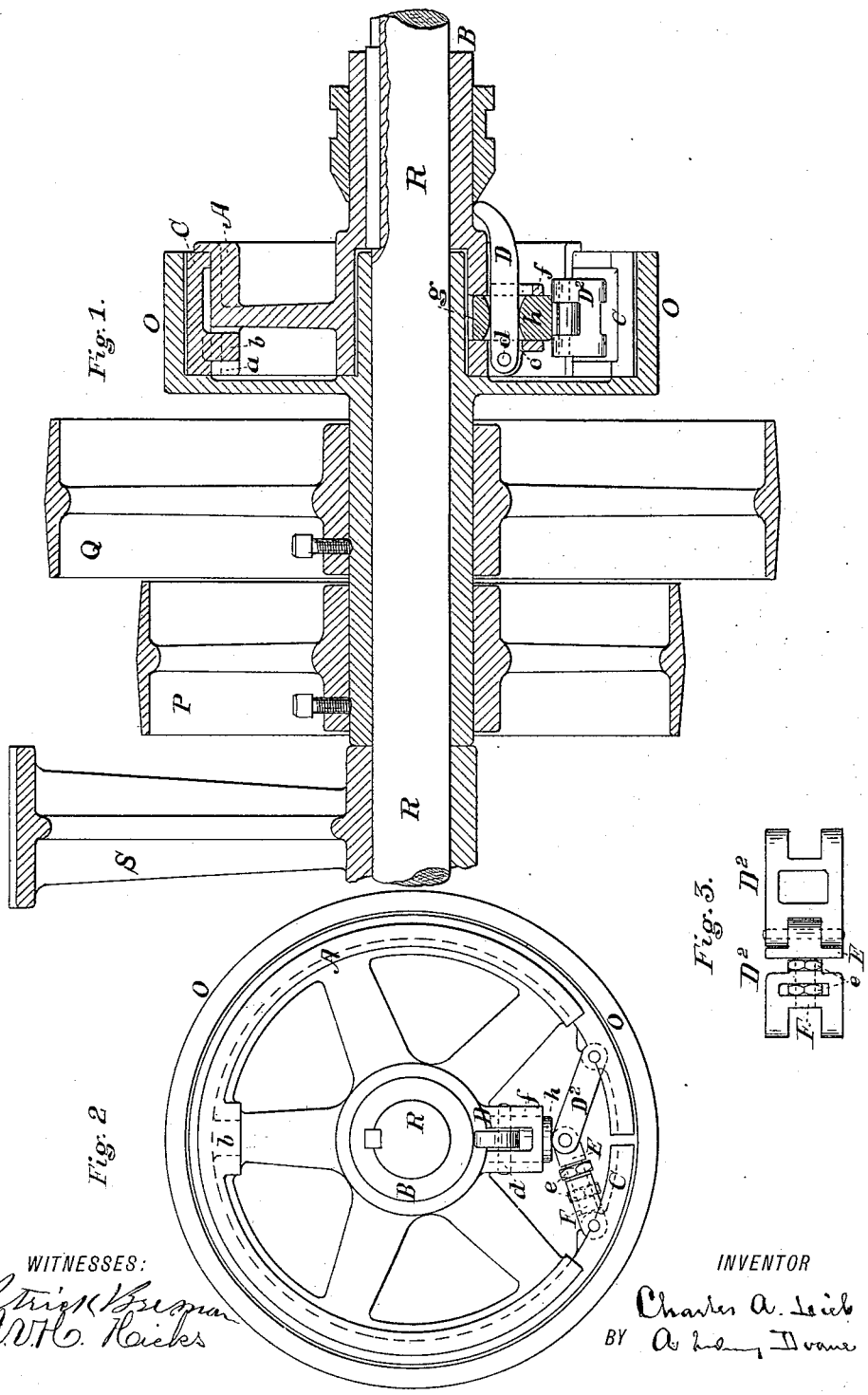
WITNESSES:
INVENTOR
Charles A. Lieb
BY
ATTORNEY

UNITED STATES PATENT OFFICE.

CHARLES A. LIEB, OF NEW YORK, N. Y.

FRICTION-PULLEY.

SPECIFICATION forming part of Letters Patent No. 329,575, dated November 3, 1885.

Application filed September 1, 1885. Serial No. 175,895. (No model.)

*To all whom it may concern:*

Be it known that I, CHARLES A. LIEB, of the city, county, and State of New York, have invented Improvements in Friction-Pulleys; and I do hereby declare that the following is a full, clear, and correct description of the same, reference being had to the accompanying drawings, making part of this specification, and to the letters of reference marked thereon, in which—

Figure 1 is a sectional view of a countershaft, showing my improved friction-pulley in position on the same. Fig. 2 is a sectional view of my friction-pulley. Fig. 3 is a top view of one of the toggles employed.

In the drawings like parts of the invention are designated by the same letters of reference.

The nature of the present invention consists in improvements, as more fully hereinafter set forth, in the construction of friction-pulleys, the object of the invention being the production of a friction-pulley reliable in operation and in which any lost motion or wear of the friction-surface can be easily and readily corrected.

To enable those skilled in the arts to make and use my invention, I will describe the same.

A shows a flanged wheel, supported by a hollow journal or sleeve, B, extending from the hub and projecting beyond the face of the wheel A. The flanged portion of the wheel is slotted, as at $a$, to allow the tongue $b$ of a split ring, C, to move to and fro in the same, and by this slot $a$ the split ring C is guided and its movement controlled as it is expanded or contracted, (so to speak,) as hereinafter set forth. The flanged portion of the wheel A is further slotted, as at $c$, to receive one end of a curved lever, D, free to move upon a pin, $d$, passed through it and the slotted portion $c$.

C is a split ring, placed over the flange of the wheel A, the face of which ring when in its normal position is in line with the periphery of the flanged wheel A. This split ring C is provided with a tongue, $b$, fitting into and free to move in the slotted portion $a$ of the flanged wheel A, while to its upper ends are pinned the toggles $D^2 D^2$, connected by a swiveled link, E. From the center of this link E projects a central screw-threaded stud, F, with which engage the screw-threaded nuts $e$, the position of said nuts $e$ upon the screw-threaded stud F being varied as required to bring one of the toggles $D^2$, through which the screw-threaded stud F is passed, nearer to or farther away from the other toggle $D^2$ by loosening the nuts $e$ upon the threaded stud F positioning the toggle $D^2$ as required by turning it and then tightening the nuts $e$ upon the threaded stud F. This construction of the toggles is availed of to take up any lost motion that may occur from friction in the use of the split ring C. One of the nuts $e$ is placed within the slotted portion of the toggle $D^2$ upon the screw-threaded stud. The other nut is placed on the threaded stud between this toggle and the link-connection E. The thickness of the nut $e$ between the link E and the toggle $D^2$ governs the extent to which the toggle $D^2$ can approach the link E, and the length of the stud F and thickness of the nut $e$ received in the slotted portion of this toggle $D^2$ the extent to which it (the toggle) can be removed from the link. The nuts form locknuts, retaining the toggle $D^2$ in the required position; and it will be readily understood that the extent to which the split ring C can be expanded will be governed by increasing or diminishing the distance between the toggle $D^2$ and the link-connection E. Directly below the center of the toggles the flanged wheel A is provided with a short lug, $f$, slotted, as at $c$, and provided with an opening, $g$, to allow a circular pin, $h$, to be moved to and fro in the same and have a bearing upon the link E, connecting the toggle, so that the toggles are expanded as the circular pin $h$ is thrown out by depressing the curved lever D by any appropriate mechanical device, by a loose collar slipped over the journal B, by a movable lever, or by any device employed to depress the curved lever D, and by such depression cause the circular pin to be thrown out, bear upon the central link, and thus expand the toggles by bringing them from the inclined position they naturally occupy into a position nearly horizontal with each other.

Such being the construction, the operation will be readily understood. The friction-pulley consisting of the wheel constructed as set forth and provided with the split ring is placed upon a shaft, either main or counter, within an ordinary pulley, O, free to revolve upon the shaft on which it is placed. When desired to convert this loose pulley O into a "fast pulley," as it is technically termed, the curved lever D is depressed by any suitable mechanical device, the circular pin $h$ is thrown out from its position within the lug $g$, caused to impinge upon the central link-connection, L, and the toggles $D^2$ and $D^2$ are brought into nearly a horizontal position, thus expanding or throwing out the split ring C and causing the same to bind and have a frictional bearing upon the interior of the loose pulley O, thus rendering the same a fast pulley. A reversal of this operation causes the toggles to be restored to their former inclined position relative to each other and the split ring C to be contracted, so to speak, and cease to bear upon the loose pulley.

The means for correcting any lost motion of the split ring have been already set forth.

Numerous advantages result from the use of a friction-pulley constructed as described, among which may be cited the ability to transmit power from story to story of a building by its employment upon a counter-shaft, and using the same instead of a main shaft for this purpose, the power passing over a belt carried by the loose pulley O, and also passed over a similar pulley on the counter-shaft on the floor above or below, as the case may be. In Fig. 1 of the drawings such an arrangement is shown, where the pulleys over which the belt may be passed are shown of different speeds, and are designated as P and Q and the counter-shaft by R, one of the hangers supporting the counter-shaft, as S.

I am aware that a friction-pulley provided with a split ring operated by toggles is not new, nor do I desire to claim the same; but I am not aware that in any such class of pulleys any means for correcting or taking up the lost motion of the split ring has been provided.

Disclaiming the use of a split ring operated by toggles,

I claim as new—

In a friction-pulley, the combination of the following elements: a pulley, O, flanged wheel A, hollow journal B, split ring C, toggles $D^2$ and $D^2$, with central link, E, screw-threaded stud F, with lock-nuts $e$, and the curved lever D, constructed and operating substantially as and for the purposes specified.

CHARLES A. LIEB.

In presence of—
   WILLIAM V. H. HICKS,
   A. SIDNEY DOANE.